United States Patent [19]
Grant

[11] Patent Number: 5,257,894
[45] Date of Patent: Nov. 2, 1993

[54] SMALL VEHICLE STOWABLE RAMP SYSTEM

[76] Inventor: Howard K. Grant, 3618 Phillips, Berkley, Mich. 48072

[21] Appl. No.: 872,029

[22] Filed: Apr. 23, 1992

[51] Int. Cl.$^5$ .............................................. B65G 67/02
[52] U.S. Cl. .................................... 414/537; 414/558
[58] Field of Search ............... 414/469, 477, 480, 523, 414/531, 532, 537, 538, 556, 558, 921; 14/71.1

[56] References Cited

U.S. PATENT DOCUMENTS

| | | | |
|---|---|---|---|
| 782,165 | 2/1905 | McElvain | 414/537 |
| 3,580,373 | 5/1971 | Stickle | 14/71.1 X |
| 3,768,673 | 10/1973 | Nydam et al. | 414/537 X |
| 4,078,678 | 3/1978 | Tordella | 414/537 |
| 4,380,415 | 4/1983 | Higginson et al. | 414/537 |
| 4,601,632 | 7/1986 | Agee | 414/537 |
| 4,624,619 | 11/1986 | Uher | 414/401 X |
| 4,685,857 | 8/1987 | Goeser et al. | 414/537 X |
| 4,900,217 | 2/1990 | Nelson | 414/537 |
| 4,941,703 | 7/1990 | Curry | 414/537 X |
| 5,160,236 | 11/1992 | Redding et al. | 414/921 X |

FOREIGN PATENT DOCUMENTS 0839774 7/1981 U.S.S.R. ................ 414/469

OTHER PUBLICATIONS

ROLL OUT Rolling Deck For Pickup Truck & Vans brochure, author unknown.

*Primary Examiner*—Michael S. Huppert
*Assistant Examiner*—James Keenan
*Attorney, Agent, or Firm*—Weintraub, DuRoss & Brady

[57] ABSTRACT

A stowable loading ramp assembly for small vehicles, such as pickup trucks, vans and trailers, which includes a stowing chamber and an extendable loading ramp. The assembly is installable in a truck bed, or the like, with the stowed loading ramp access positioned toward the rear or tail gate of the vehicle. The loading ramp is locked in the stowed position by a floating locking plate, which is raised to permit the loading ramp to be withdrawn from the stowing chamber. The floating locking plate rides on a wheel on the top surface of the loading ramp until the ramp is fully withdrawn and, at that point, the wheel drops from the top surface loading ramp, locking the ramp in position. The floating locking plate also serves as a transition surface between the loading ramp and the top surface of the stowing chamber. Additionally, the loading ramp has attached thereto support legs, which provide support during the loading operation and, table legs which position the ramp at a height to be used as a table.

17 Claims, 2 Drawing Sheets

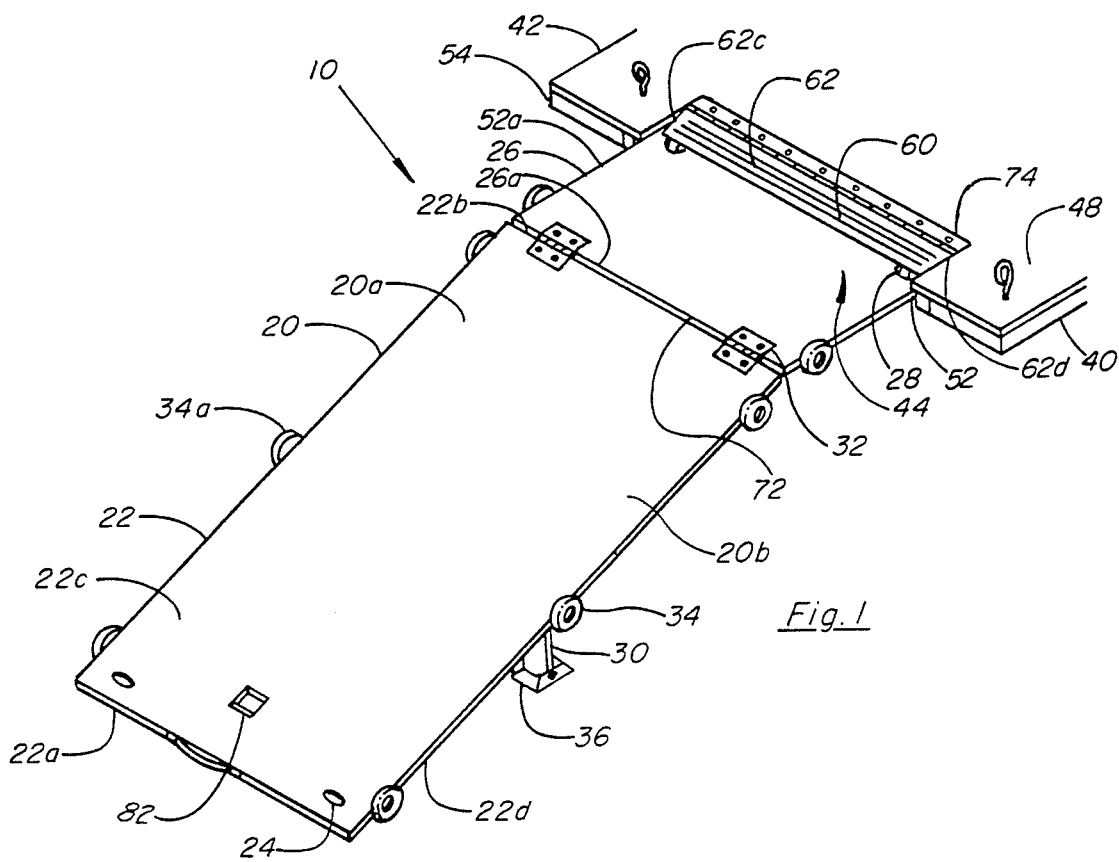
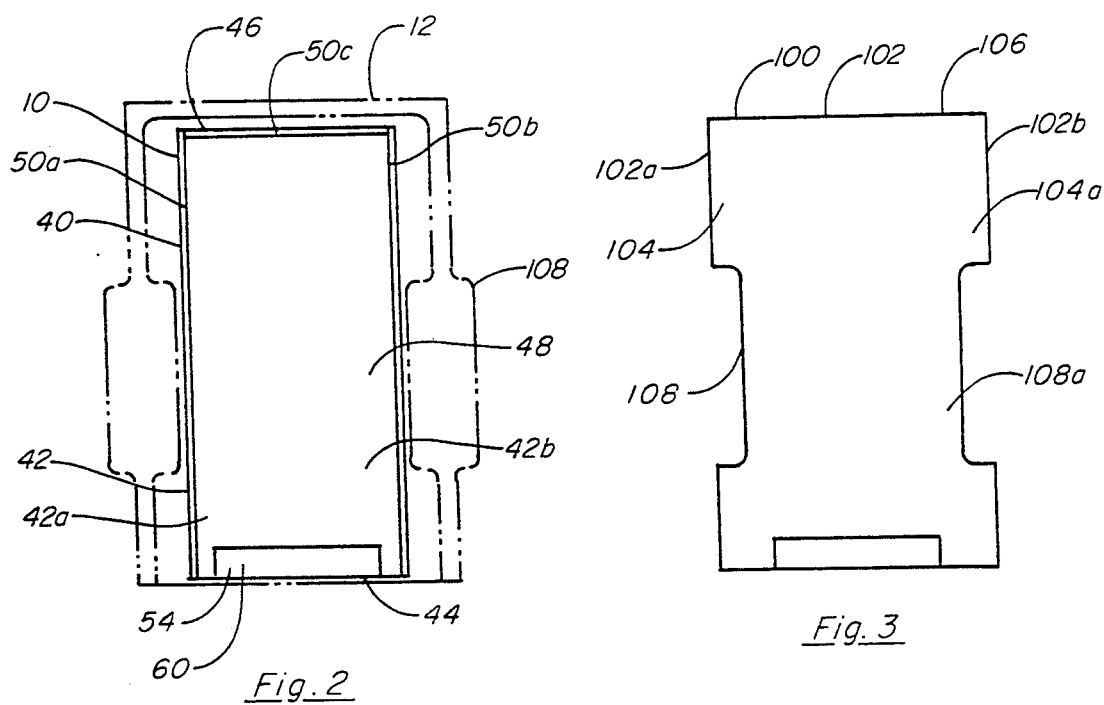
Fig.1
Fig.2
Fig.3

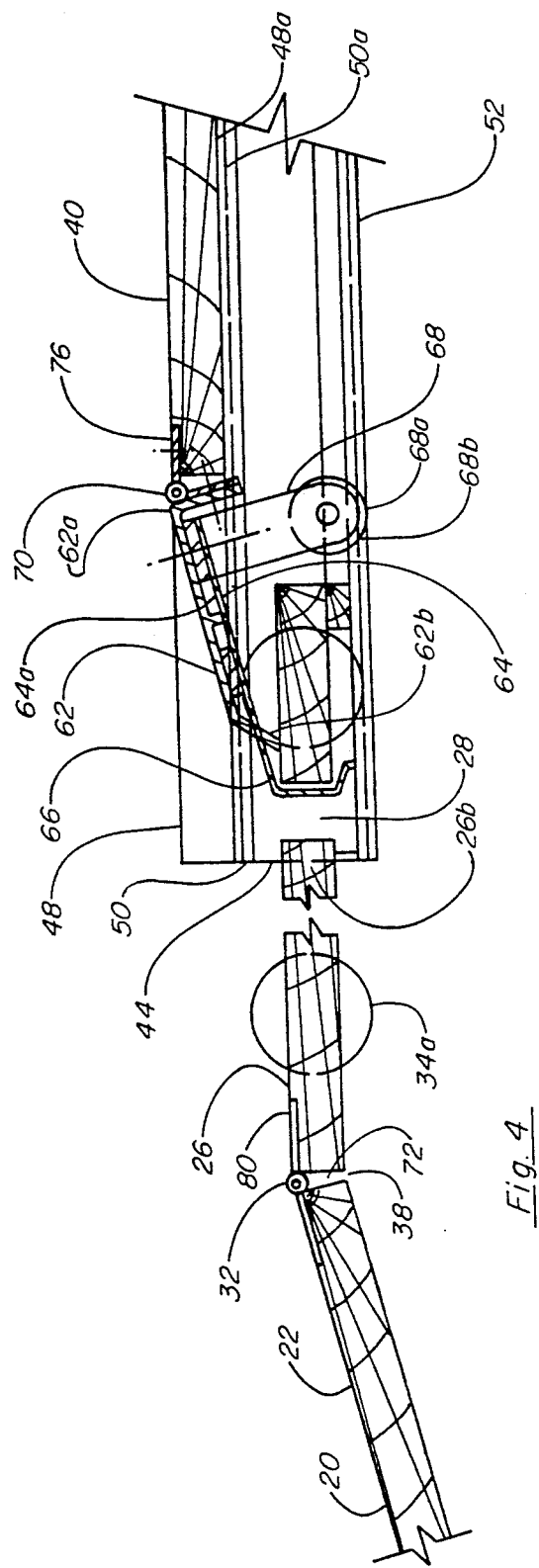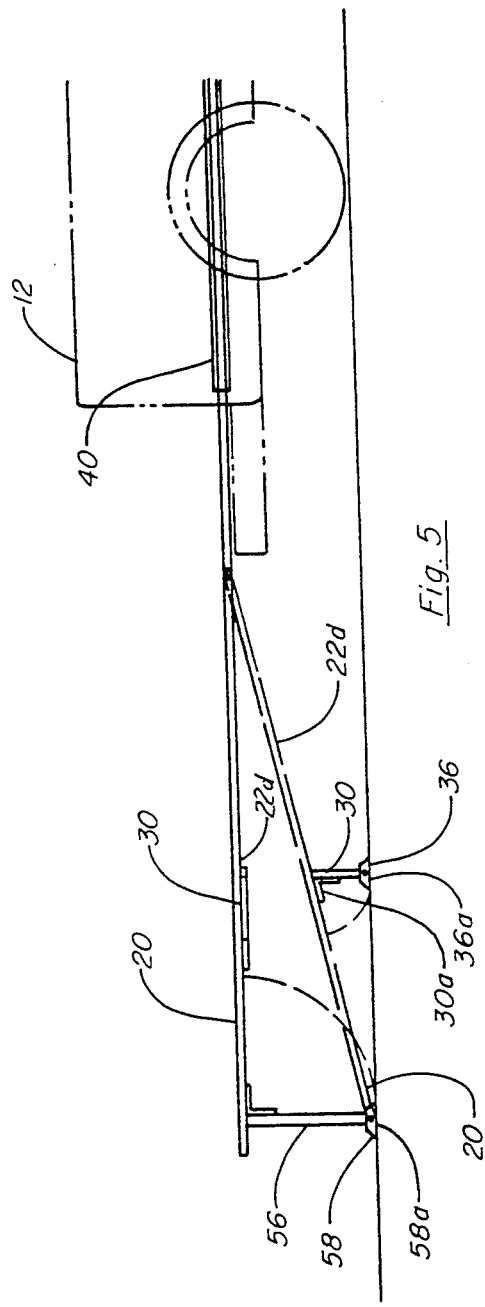

SMALL VEHICLE STOWABLE RAMP SYSTEM

BACKGROUND OF THE INVENTION

1. Field of the Invention

The present invention relates to vehicle ramps. More specifically, the present invention relates to vehicle ramps stowable within the vehicle. Even more specifically, the present invention concerns stowable ramps which are used for loading vehicles and which are useful as working tables.

2. Description of the Prior Art

The usefulness of providing loading ramps for small vehicles such as pickup trucks, vans, or trailers has long been known within the art. For example, in U.S. Pat. No. 1,699,882, there is disclosed a vehicle fitted with two stowable skid bars, one on each side of the loading deck of the vehicle. According to this patent, a collapsible skid plate is folded and fitted as a tailgate for the vehicle. When a loading ramp is desired, two skid bars are moved from their location and placed in position with one end of the bars on the loading surface or ground and the other end on the bed of the vehicle. The collapsible skid plate is then unfolded and rested upon the skid bars.

The disadvantages of the skid plate loading ramp becomes apparent when trying to load heavy items with small casters or heavy items without casters. These items are generally slid up the ramps and may become caught at the gaps or off-sets existing at the intersections of the ramp loading surface sections. At each location, the person or persons using the ramp must lift the item over the gaps and off-sets. Also, the ramp has no other support in the loading position, except for the skid bar. This limits the weight of an object that can be loaded using the ramp.

Loading ramps have included single piece ramps stowable beneath a stowing deck. For example, U.S. Pat. No. 4,078,678 teaches a single piece ramp which is stowable beneath a false floor or deck fitted within a van. The ramp is stowed beneath a false floor until it is to be used. When it is needed, the ramp is pulled from beneath the floor until rollers on each side of the ramp seat themselves into a locking notch provided in the supports on each side of the false floor.

The single ramp of this invention reduces the number of gaps or offsets which would otherwise trap heavy objects loaded by sliding or rolling them up the ramp. However, there are several disadvantages with this type of ramp. Because of their location, the locking wheels act as a pivot point and the ramp may see-saw when an object or a user moves from one side of the pivot point to the other. Also, because of the pivot location, the end of the ramp nearest the false floor becomes off-set and may require substantial lifting to move an object from the ramp to the false floor. Further, the single locking points of the ramp only provide for an automatic lock when the ramp is extended. When the ramp is stowed, it is not locked in place, it can move forward and backward unless the van rear doors are closed to stop the movement.

Another type of stowable loading ramp includes telescopic ramps. U.S. Pat. Nos. 4,601,632 and 4,900,217 are examples of telescopic ramp assemblies. Essentially, they teach an assembly which includes a chamber or sleeve and a telescopic loading ramp which is stowed within the chamber when not extended. In both of the above-inventions, the loading ramps, when extended, have two sections. One section is the long section which rests on the ground or loading surface. This section is connected to a second section which usually rests on the tailgate or a bed of the vehicle when the ramp is extended.

When the ramp is stowed, the first section slides into the second section. Both sections, then, slide into the stowing chamber or sleeve. In both of the above-inventions, when the ramp is extended it is automatically locked in position within the chamber by stops or studs located on each side of the second section of the ramp which engage locking slots on each side of the stowing chamber. When the ramps are stowed, manually installed locking pins hold the ramp in their stowed position.

Both ramps have many of the same disadvantages as the previously cited ramps. Because the ramps are telescopic, there is no smooth loading surface. Several offsets or gaps exist which interfere with the sliding and rolling of heavy objects up the ramp. There is no automatic two-way locking of the ramps. It is automatically locked only when extended. Manual locking is required when the ramp is stowed. Both inventions use heavy strength metal to provide the strength needed during use. This makes them heavy and hard-to-handle during extension and stowing.

Another example of a stowable ramp is U.S. Pat. No. 4,624,619. This invention discloses a stowing chamber with a two-section loading ramp. When the ramp is extended, it is automatically stopped by two pins, extending from the top of the ramp. The pins strike a bumper rail on the stowing chamber when the ramp is extended. When the ramp is stowed, manually inserted pins hold it in place.

There is an angled strip attached to the end of the stowing chamber between the top surface of the chamber and the top surface of the loading ramp. This, apparently, is to ease the transition between the two surfaces. The angled strip has its disadvantages. The angle is steep and short. This still makes sliding or rolling heavy objects up the ramp difficult.

Other disadvantages are apparent: the gap between the two ramp sections is large; the ramp is manually locked in its stowed position; there is no additional support for heavy loads.

This type of loading ramp is usually designed to be used by one person. Therefore, there is a need for a ramp that is easy to handle, limits the amount of user interaction, provides a secure and usable surface to easily load and unload heavy objects which can be slid or rolled on wheels and can be used as a secure work table or the like. It is these to which the present invention is directed.

SUMMARY OF THE INVENTION

The stowable ramp assembly of the instant invention is designed to be installed in pickup trucks, vans, trailers and similar type small vehicles. The stowable ramp assembly comprises:

(a) a loading ramp, the loading ramp comprising:
  (1) a first portion, the first portion having at least one locking slot formed therein;
  (2) a second portion, the second portion being hingedly attached to the first portion and having at least one locking slot formed therein, coaxial with the locking slot of the first portion; and (3) at least one support leg attached to the first portion of the ramp; the support leg having a means for adjusting for an irregular loading surface attached thereto.

(b) a stowing chamber for the ramp, the chamber comprising:
(1) a top deck, the top deck having an open end and a closed end, a top surface and a bottom surface; and
(2) means for supporting the top deck disposed on the bottom surface of the deck.

(c) a floating lock plate, the plate comprising:
(1) a surface plate, the surface plate hingedly connected to the stowing chamber, the surface plate having a top surface and a bottom surface; and
(2) at least one locking bracket extending from and integral with the bottom surface of the plate, the bracket being coaxial with the locking slots of the ramp; and wherein the loading ramp, floating lock plate, and the stowable chamber cooperate to define a loading ramp assembly in the extended and retracted positions.

The loading ramp, when not being used, is stored or stowed beneath or within the stowing chamber and is locked in place by the floating lock plate. The loading ramp may have track wheels mounted on each side which are in-line with and operate within tracks that are mounted to the top deck of the stowing chamber. The track wheels permit the stowing ramp to be easily removed or stored with a minimum of effort by the person removing or storing the ramp.

The ramp also utilizes at least one support leg which is mounted to the bottom of the first portion of the loading ramp. The support leg has a means for adjusting which permits the leg to adjust to varied ground levels. The means for adjusting may be an adjustable foot. The leg acts as a support for the ramp while it is being used as a loading ramp. The ramp may also have at least one table leg. The table leg acts as a support for the ramp while being used as a work table or as a table for other types of activities.

A floating lock plate defines the locking mechanism for the ramp. The lock plate functions to automatically lock the ramp in position when it is extended to its loading position and when its stowed in position within the stowing chamber. Also, the floating lock plate functions as a transition plate between the ramp and the top surface of the stowing chamber. This permits heavy objects to be slid up the ramp and heavy objects with small wheels to be easily transported on the ramp to the top surface of the loading deck. The person loading the vehicle is not required to lift the objects from one surface to the other.

A means for filling a gap formed between the first portion and the second portion of the ramp may be a collapsible rubber or plastic-type filler. The filler is fixed within the gap formed at the intersection of the first portion and the second portion of the loading ramp. Also, the same or similar filler may be fixed within a gap at the intersection of the stowing chamber and the floating lock plate, if needed. This filler prevents objects from becoming lodged within the gaps. The filler expands when the gap is open and compresses when the gap is closed.

Various features, advantages and other uses of the present invention become more apparent by referring to the following description and drawings. Throughout the following description and drawings, identical reference numbers are used to refer to the same components shown in multiple figures of the drawing.

BRIEF DESCRIPTION OF THE DRAWINGS

FIG. 1 is a perspective drawing of the stowable ramp;

FIG. 2 is a plan view of the stowable ramp of the preferred embodiment;

FIG. 3 is a plan view of the stowable ramp; second embodiment

FIG. 4 is a partial section of the ramp and face plate and stowing chamber; and

FIG. 5 is a side view of the loading ramp in table position.

DESCRIPTION OF THE PREFERRED EMBODIMENT

Referring now to the drawings, and in particular FIGS. 1, 2, and 4, there is depicted a first embodiment of a stowable ramp assembly of the instant invention, generally, denoted at 10. The stowable ramp assembly 10 herein, generally, comprises:

(a) a loading ramp 20, the loading ramp 20 comprising:
(1) a first portion 22, the first portion 22 having at least one first locking slot 24 formed therein;
(2) a second portion 26, the second portion 26 being hingedly attached to the first portion 22 and having at least one second locking slot 28 formed therein, coaxial with the locking slot 24 of the first portion 22;
(3) at least one support leg 30 attached to the first portion 22 of the ramp 20; the support leg having a means for adjusting 36 for irregular loading surface attached thereto;

(b) a stowing chamber 40, the chamber 40 comprising:
(1) a top deck 42, the top deck 42 having an open end 44 and a closed end 46, a top surface 48 and a bottom surface 48a;
(2) means 54 for supporting the top deck 42 disposed on the bottom surface 48a of the deck 42; and (c) a floating lock plate 60, the lock plate 60 comprising:
(1) a surface plate 62, the surface plate 62 hingedly connected to the stowing chamber 40, the surface plate 62 having a top surface 64 and a bottom surface 64a; and
(2) at least one locking bracket 66 extending from the surface plate 62, the locking bracket 66 integral to the bottom surface 64 of the plate 62, the bracket 66 being coaxial with the first and second locking slots 24, 28 of the ramp 20; and wherein the loading ramp 20, floating lock plate 60, and the stowable chamber 40 cooperate to define a loading ramp assembly 10 in the extended and retracted positions.

Generally, the stowable ramp assembly 10 is installed in small vehicles 12 such as pickup trucks, vans or trailers to permit the operator of said vehicle or other persons to easily load or unload equipment and cartons or the like into and from the vehicle. The ramp assembly 10 is designed and is intended to be used by one person without assistance.

The loading ramp 20, as depicted in FIG. 1, has a first portion 22, the first portion 22 having a first end 22b and a second end 22a. The first portion has at least one, preferably two, locking slots 24 formed therein proximate the first end 22a of the first portion 22. Also, the first portion may have at least one wheel 80 slot formed therein proximate the first end 22a of the first portion 22. Attached to the first portion 22 is a second portion 26, which has a first end 26a and a second end 26b. The second portion 26 has at least one locking slot 28, preferably two, formed therein which is coaxial with the slot 24 in the first portion 22 and proximate to the second end 26b of the second portion 26. The first end 26a of the second portion 26 is hingedly connected to the second end 22b of the first portion 22. The loading ramp is preferably made from a natural wood sheet. However, metal or plastic may be used.

A means 32 for hinging is cooperatively connected to the first portion 22 and the second portion 26 using a screw type fastener or the like. The means 32 for hinging, preferably, comprises at least one heavy-duty, bidirectional hinge 80, such as a piano hinge, which is a commercially available product. The first portion 22 and the second portion 26 of the ramp are preferably made from a natural wood sheet or the like, but may be made from metal or plastic.

The first portion 22 of the loading ramp has at least one support leg 30 attached thereto. The support leg 30 is pivotally attachable to a retaining bracket 30a which is removably mounted on a bottom surface 22d of the first portion 22 of the loading ramp 20 approximately half way between the first end 22a and the second end 22b of the loading ramp 20.

The support leg 30, has a first means 36 for adjusting and providing for irregular loading surfaces. This permits the support leg 30 to accommodate for uneven loading surfaces, e.g. uneven ground. The means for adjusting 36 comprises a first movable foot 36a which is pivotably attached to the support leg 30. The foot may be made from metal or plastic or the like.

The support leg 30 pivots into the retaining bracket 30a permitting the support leg 30 to be retracted into the retaining bracket 30a and against the bottom surface 22d of the loading ramp 20 when the loading ramp 20 is in its stowed position.

The loading ramp 20 may, also, have a table leg 56 attached thereto. The table leg 56 is pivotably attached to the bottom surface 22d of the first portion 22 proximate the first end 22a. The table leg 56 has a retaining bracket 56a to hold the leg 56 when retracted. The table leg has second means 58 for adjusting for irregular loading surfaces pivotably attached thereto. The means for adjusting means 58 comprises a second movable foot 58a pivotably attached to the leg 56. The foot 58a may be made of metal or plastic or the like.

The loading ramp may have at least two track wheels, 34, 34a, one wheel 34, 34a rotatably mounted on each side 20a, 20b of the loading ramp 20. The track wheels 34, 34a permit the loading ramp 20 to be easily moved into and retracted from the stowing chamber 40. The track wheels 34, 34a operate within corresponding tracking rails 52, 52a attached to the stowing chamber 40.

A means 38 for filling a gap 72 formed between the first portion 22 and the second portion 26 of the loading ramp 20 is comprised of an alternately collapsible and expandable material which is generally made from rubber, plastic or the like. The material is removably inserted into the gap 72 and occupies the space for the entire length of the gap 72, except for hinges, from the first side 20a to the second side 20b of the ramp.

The stowing chamber 40 is used to contain the loading ramp 20 in the stowing position. The stowing chamber 40 generally comprises a top deck 42 with an open end 44 and a closed end 46, a first side 42a and a second side 42b and a top surface 48 and a bottom surface 48a. The top deck 42 has a notch 54 formed therein proximate the open end 44 of the deck 42 for inserting a floating lock plate 60. The top deck 42 is preferably made of wood or the like, but may be made from metal or plastic.

A means 50 for supporting the top deck is, preferably, at least a pair of rail supports 50a and 50b, mounted on the bottom surface 48a of the deck 42 and parallely located on each side 42a, 42b of the deck 42. A third rail support 50c may be mounted on the bottom surface 48a at the closed end 46 of the top deck 42 and is essentially perpendicular to the two side supports 50a, 50b. The rail supports 50a, 50b and 50c may be made from wood, metal or plastic and are removably fastened to the top deck 42 by threaded fasteners or the like (not shown).

Tracking rails 52, 52a, may be mounted to the bottom surface 48a of the deck 42 and are used for supporting the track wheels 34, 34a of the loading ramp 20. The tracking rails 52, 52a are coaxial with said track wheels 34, 34a. The tracking rails 52, 52a may be made from metal or plastic and are removably fastened to the side rails 50a, 50b, by threaded fasteners (not shown) or the like.

The floating lock plate 60 is used to lock the loading ramp 20 in position in its extended and/or stowed positions. The lock plate 60 also provides for a smooth transition from the loading ramp to the upper surface 48 of the top deck 42. The floating lock plate 60 generally comprises a surface plate 62, the surface plate 62 having a hinging end 62a and a seating end 62b, a top surface 64 and a bottom surface 64a, a first side 62c and a second side 62d.

Disposed on the bottom surface 64a of the lock plate 60 and extending therefrom is at least one, but preferably a pair of, locking brackets 66, only one of which is shown. The locking bracket 66 is securely connected to the bottom surface 64a of the floating lock plate 60 by welding or the like and is substantially coaxial with and engages the locking slots 24, 28 of the loading ramp 20. The floating lock plate 60 may be made from metal or plastic.

At least one wheel bracket 68 is securely attached to the bottom surface 64a of the floating lock plate 60 by welding or the like. The wheel bracket comprises a bar 68a and a traverse wheel 68b mounted thereon, which is rotatably attached thereto. The traverse wheel 68b rolls on the top surface 20c of the loading ramp 20, as the ramp 20 is extended or stowed, raising the locking bracket of the floating lock plate 60 above the surface of the ramp to prevent scarring and marring of the loading ramp 20 and to facilitate extending and retracting of the ramp 20. The wheel bracket 68 is coaxial with and engages the wheel slot 82 of the loading ramp 20.

Means 70 for hinging the floating plate 60 to the stowable chamber is preferably comprised of at least one heavy duty type piano hinge 76 attached to the surface plate 62 and the stowing chamber 40.

When the locking bracket 66 of the lock plate 60 is inserted into the locking slot 28 of the second portion 26 of the loading ramp 20, the seating end 62b of the surface plate 62 rests upon the surface of the loading ramp 20. The seating end 62b of the surface plate 62 is at an acute angle from the top surface 64 of the surface plate 62 to the bottom surface 64a. The angled seating end 62b provides a smooth transition between top surface 20c of the loading ramp 20 and the top surface 64 of the floating lock plate 60.

In use, a single person can remove the loading ramp 20 from the stowing chamber 40 by lifting the floating lock plate 60 until the locking bracket 66 is removed from the locking slot 24 and then sliding the loading ramp 20 from the chamber 40. This permits the floating lock plate 60 to float freely on the wheel 68b attached to the wheel bracket 68a until the wheel drops from the loading ramp 20. The operator then places the first end 22a of the first portion 22 of the loading ramp 20 onto the loading surface. The operator lowers the support legs 30 beneath the first portion of the loading ramp 20. The support legs 30 adjust to the ground surface. The legs 30 provide additional support for the loading ramp 20.

Alternatively, as shown in FIG. 5, should the operator choose to use the loading ramp 20 as a work table 90 or some other form of table activity, the operator may lower the table legs 56 until the table 90 is supported by the table leg 58, thereby creating a work table 90 for the operator.

A second embodiment of the stowable ramp assembly 100, as shown in FIG. 3, provides for a stowing chamber 102 with a fitting wing 104, 104a extending from each side 102a, 102b of the chamber 102, proximate the closed end 106 of the chamber 102. The fitting wings 104, 104a are optionally provided to customize the stowable ramp assembly 100 to accommodate for vehicle wheel housings 108, 108a that may extend into the usable hauling area of the vehicle 12. In all other respects, the first and second embodiments are the same.

Having, thus, described the invention, what is claimed is:

1. A stowable extendable and retractable ramp assembly for a vehicle comprising:
   (a) a loading ramp, the loading ramp comprising:
      (1) a first portion, the first portion having at least one first locking slot formed therein;
      (2) a second portion, the second portion being hingedly attached to the first portion and having at least one second locking slot formed therein, the second locking slot being coaxial with the first locking slot; and
      (3) at least one support leg, the support leg attached to the first portion of the ramp; the support leg having means for adjusting for an irregular loading surface;
   (b) a stowing chamber, the stowing chamber comprising:
      (1) a top deck, the top deck having an open end and a closed end, a top surface and a bottom surface; and
      (2) means for supporting the top deck, the means for supporting disposed on the bottom surface of the deck;
   (c) a floating lock plate, the lock plate comprising:
      (1) a surface plate, the surface plate hingedly connected to the stowing chamber proximate the open end, the surface plate having a top surface and a bottom surface;
      (2) at least one locking bracket extending from the surface plate, the locking bracket being integral with the bottom surface of the surface plate, the locking bracket being coaxial with the locking slots of the
   wherein the locking bracket of the floating lock plate rides in an unlocked condition upon the loading ramp during an extension thereof until it engages the first locking slot, thereby locking in position the floating lock plate to the ramp in an extended position; and
   further wherein the locking bracket of the floating lock plate rides in an unlocked condition upon the loading ramp during a retraction thereof until it engages within the second locking slot, thereby locking in position the floating lock plate to the ramp in a retracted position.

2. The stowable ramp assembly of claim 1, further comprising at least two track wheels, wherein one of the at least two track wheels is mounted on a side of the loading ramp and a second of the at least two track wheels is mounted on an opposite side of the loading ramp.

3. The stowable ramp assembly of claim 2, further comprising at least two tracking rails, the tracking rails disposed on the bottom surface of the top deck of the stowing chamber, the tracking rails being coaxial with the track wheels of the loading ramp.

4. The stowable ramp assembly of claim 1, further comprising at least one wheel bracket, the wheel bracket integral with the bottom surface of the surface plate, the wheel bracket having a traverse wheel rotatably attached thereto.

5. The stowable ramp assembly of claim 1, wherein:
   a gap is formed between the first portion and the second portion of the loading ramp, the ramp further comprising means for filling the gap.

6. The stowable ramp assembly of claim 5, wherein the means for filling the gap formed between the first portion and the second portion of the loading ramp comprises an elastomeric material.

7. The stowable ramp assembly of claim 1, further comprising:
   at least one first bidirectional hinge for hingedly attaching the first portion of the loading ramp to the second portion of the loading ramp.

8. The stowable ramp assembly of claim 7, further comprising:
   a second bidirectional hinge for hingedly connecting the floating lock plate to the stowing chamber.

9. The stowable ramp assembly of claim 1 wherein the loading ramp is formed of a natural wood sheet.

10. The stowable ramp assembly of claim 1 wherein the support leg comprises:
    (a) a retainer bracket, the retainer bracket removably attached to the bottom surface of the first portion of the loading ramp; and
    (b) a tubular leg, the tubular leg being pivotably attached to the retainer bracket.

11. The stowable ramp assembly of claim 10, wherein the first means for adjusting to an irregular loading surface comprises:
    a first movable foot pivotably attached to the tubular leg of the support leg.

12. The stowable ramp assembly of claim 1 wherein the top deck of the stowing chamber comprises a natural wood sheet.

13. The stowable ramp assembly of claim 1 wherein the means for supporting the top deck of the stowing chamber comprises:
    (a) at least two side rail supports, the side rail supports disposed on the bottom surface of the top deck; and
    (b) an end rail support, the end rail support disposed on the bottom surface of the top deck substantially perpendicular to the side rail supports and proximate the closed end of the stowing chamber.

14. A stowable extendable and retractable ramp assembly for a vehicle comprising:
    (a) a loading ramp, the loading ramp comprising:
        (1) a first portion, the first portion having at least one first locking slot formed therein;
        (2) a second portion, the second portion being hingedly attached to the first portion, the second portion having at least one second locking slot formed therein, the second locking slot being coaxial with the first locking slot;
        (3) at least one support leg attached to the first portion of the ramp, the support leg having a first means for adjusting to an irregular loading surface;
        (4) at least one table leg attached to the first portion of the loading ramp forward of the support leg, the table leg having a second means for adjusting to an irregular loading surface;
    (b) a stowing chamber, the stowing chamber comprising:
        (1) a top deck, the top deck having an open end and a closed end, a top surface and a bottom surface; and
    (c) a floating lock plate, the floating lock plate comprising:
        (1) a surface plate, the surface plate hingedly connected to the stowing chamber, the surface plate having a top surface and a bottom surface; and
        (2) at least one locking bracket extending from the surface plate and integral to the bottom surface of the plate, the locking bracket being coaxial with the locking slots of the ramp;
    wherein the loading ramp, the floating lock plate, and stowing chamber cooperate to define the loading ramp assembly in an extended position and in a stored retracted position; and
    further wherein the locking bracket of the floating lock plate rides in an unlocked condition upon the loading ramp during an extension thereof until it engages within the first locking slot, thereby locking in position the floating lock plate to the ramp in an extended position; and
    further wherein the locking bracket of the floating lock plate rides in an unlocked condition upon the loading ramp during a retraction thereof until it engages within the second locking slot, thereby locking in position the floating lock plate to the ramp in a retractable position.

15. The stowable ramp assembly of claim 14 wherein the first means for adjusting to an irregular loading surface comprises:
    a first movable foot pivotably attached to the support leg.

16. The stowable ramp assembly of claim 15, wherein the second means for adjusting to an irregular surface comprises:
    a second movable foot pivotably attached to the table leg.

17. A stowable extendable and retractable ramp assembly for a vehicle comprising:
    (a) a loading ramp, the loading ramp comprising:
        (1) a first portion, the first portion having at least one first locking slot formed therein;
        (2) a second portion, the second portion being hingedly attached to the first portion and having at least one second locking slot of the first portion; and
        (3) at least one support leg attached to the first portion of the ramp;
    (b) a stowing chamber, the stowing chamber comprising:
        (1) a top deck, the top deck having an open end and a closed end, a top surface and a bottom surface, a first side and a second side, the top deck having a fitting wing extending from the first side and the second side, proximate the closed end; and
        (2) at least one locking bracket extending from the surface plate, the locking bracket integral with the bottom surface of the surface plate, the bracket being coaxial with the locking slots of the loading ramp; and
        (3) at least one wheel bracket attached to the surface plate;
    wherein the loading ramp, the floating lock plate, and stowing chamber cooperate to define the loading ramp assembly in an extended position and in a stored retracted position; and
    further wherein the locking bracket of the floating lock plate rides in an unlocked condition upon the loading ramp during an extension thereof until it engages within the first locking slot, thereby locking in position the floating lock plate to the ramp in an extended position; and
    further wherein the locking bracket of the floating lock plate rides in an unlocked condition upon the loading ramp during a retraction thereof until it engages within the second locking slot, thereby locking in position the floating lock plate to the ramp in a retractable position.

* * * * *

UNITED STATES PATENT AND TRADEMARK OFFICE
CERTIFICATE OF CORRECTION

PATENT NO. : 5,257,894
DATED : November 2, 1993
INVENTOR(S) : Howard K. Grant

It is certified that error appears in the above-identified patent and that said Letters Patent is hereby corrected as shown below:

In Column 7. Line 66: After "the" insert -- ramp --.

Signed and Sealed this

Twelfth Day of July, 1994

Attest:

BRUCE LEHMAN

Attesting Officer
Commissioner of Patents and Trademarks